United States Patent [19]

Hill et al.

[11] Patent Number: 5,306,442
[45] Date of Patent: Apr. 26, 1994

[54] MIXTURE OF ALKYL GLUCOSIDES AND ALCOHOLS AS FOAM INHIBITORS

[75] Inventors: Karlheinz Hill, Erkrath; Adolf Asbeck, Duesseldorf; Karl Heinz Schmid, Mettmann, all of Fed. Rep. of Germany

[73] Assignee: Henkel Kommanditgesellschaft auf Aktien, Duesseldorf, Fed. Rep. of Germany

[21] Appl. No.: 777,224

[22] PCT Filed: Apr. 27, 1990

[86] PCT No.: PCT/EP90/00680
§ 371 Date: Jan. 3, 1992
§ 102(e) Date: Jan. 3, 1992

[87] PCT Pub. No.: WO90/13345
PCT Pub. Date: Nov. 15, 1990

[30] Foreign Application Priority Data

May 5, 1989 [DE] Fed. Rep. of Germany ....... 3914906

[51] Int. Cl.$^5$ ............................................. B01D 19/04
[52] U.S. Cl. .................... 252/321; 252/358; 426/329; 426/330; 435/812
[58] Field of Search ................ 252/321, 358; 426/329, 426/330; 435/812

[56] References Cited

U.S. PATENT DOCUMENTS

| | | | |
|---|---|---|---|
| 4,477,370 | 10/1984 | Kavchok et al. | 252/321 |
| 4,626,377 | 12/1986 | Kavchok et al. | 252/321 |
| 4,793,850 | 12/1988 | Koester et al. | 71/79 |
| 4,889,925 | 12/1989 | Schmid et al. | 536/18.6 |
| 4,932,994 | 6/1990 | Koester et al. | 71/79 |
| 5,154,855 | 10/1992 | Sekiguchi et al. | 252/312 OR |
| 5,154,856 | 10/1992 | Hill et al. | 252/321 |

OTHER PUBLICATIONS

Patent Abstracts of Japan, vol. 13, No. 275, (C-610)-(Jun. 23, 1989) to 1-69695(A), Mar. 15, 1989.

*Primary Examiner*—Robert L. Stoll
*Assistant Examiner*—Daniel S. Metzimaier
*Attorney, Agent, or Firm*—Ernest G. Szoke; Wayne C. Jaeschke; Real J. Grandmaison

[57] ABSTRACT

A mixture of $C_{16}$–$C_{28}$ alkyl glucosides (A) and $C_{16}$–$C_{28}$ fatty alcohols (B) in a weight ratio (A):(B) of between 20:1 and 1:9 possesses foam inhibiting properties even when highly diluted. The mixture is suitable for use in the food industry, and is preferably employed in a chemically inert liquid carrier oil that is immiscible with water.

14 Claims, No Drawings

MIXTURE OF ALKYL GLUCOSIDES AND ALCOHOLS AS FOAM INHIBITORS

BACKGROUND OF THE INVENTION

1. Field of the Invention

This invention relates to a product based on a mixture of alkyl glucosides and aliphatic alcohols which may be used as a foam inhibitor, particularly in the food industry.

Considerable significance is attributed to foam inhibition in the food industry, for example in the production of sugar, in fermentation processes and in the recovery of yeast. By addition of suitable auxiliaries, foaming has to be reduced to a such a level that it does not interfere with the industrial production process.

Certain surface-active substances, for example huminic acids, proteins, protein and starch degradation products, pectins and saponins, such as occur widely in nature, are responsible for the troublesome and, normally, stable foams.

The formation of unwanted foams can be a serious obstacle to production in industrial plants, for example, because the capacity of the plant cannot be utilized or because considerable losses of the starting material used can occur as a result of foaming. Particular difficulties through excessive foaming can occur in a sugar factory in the clarifiers and also in the carbonizing tanks and evaporators.

The auxiliaries used for foam regulation have to be substantially removed during the working up of the end product, for example during the refining of sugar, so that they do not burden the end product. In addition, all the auxiliaries used in the production of foods have to be odorless and free from any taste and, of course, physiologically safe.

In addition, foam inhibitors which enter wastewater after use have to be completely biodegradable.

For economic reasons and to keep the quantities of additives in foods as small as possible, foam inhibitors of particularly high performance are required. High-performance foam inhibitors are distinguished by the fact that they develop their effect without any delay, i.e. spontaneously, achieve a high degree of defoaming and remain effective.

2. Discussion of Related Art

Foam inhibitors which have been proposed for use in the food industry include inter alia fatty acid monoglycerides, fatty acid polyglycol esters, polyalkylene glycols, alkylene oxide adducts with alkyl phosphoric acids, branched fatty alcohol alkoxylates and oligosaccharide alkoxylates and also natural fats and oils. Although rapidly and completely biodegradable, these foam inhibitors are not sufficiently spontaneous in their foam-inhibiting effect and do not remain effective for sufficiently long periods.

The problem addressed by the present invention was to provide foam inhibitors for the production and processing of foods which, even when added in very small quantities, would show excellent spontaneous foam-inhibiting activity and would retain that activity for long periods and, physiologically, would be completely safe. At the same time, they would be completely and rapidly biodegradable without forming metabolites in sewage treatment plants.

It is known that alkyl glucosides are readily degradable and non-toxic. However, it is also known that alkyl glucosides having $C_{12-1}$, alkyl chains are powerful foam generators.

Alkyl glucosides are mainly produced by two methods. In the direct synthesis method, glucose is directly reacted with an excess of fatty alcohol in the presence of an acid as catalyst to form the glucoside while, in the transacetalization method using a lower alcohol or glycol as solvent and reactant, a lower alkyl glucoside is initially formed, then reacting with a long carbon chain fatty alcohol in the following step to form the end product.

For example, U.S. Pat. No. 3,547,828 describes the production of a ternary mixture of alkyl oligoglucosides, alkyl monoglucosides and the corresponding free $C_{11-32}$ alkanols by the transacetalization process with butanol. To obtain products having reduced viscosities where long-chain alkanols are used, the transacetalization reaction is optionally terminated prematurely so that parts of the butyl glucoside still remain in the reaction mixture. After working up in the usual way, the higher fatty alcohol used in excess is for the most part removed in vacuo, generally to values of less than 2% by weight.

By contrast, European patent application 96 917 describes an improved process for acid-catalyzed direct synthesis with $C_{8-25}$ fatty alcohols, in which a monosaccharide, preferably glucose, is added in such a quantity that never more than 10% unreacted monosaccharide is present in the reaction mixture. After working up in the usual way, including removal of the excess fatty alcohol in a thin-layer evaporator, the process gives a product containing 20 to 70% by weight alkyl monoglucoside, less than 10% mono- and polysaccharides, less than 2% by weight free fatty alcohol and, for the rest, alkyl polyglucosides.

It has now been found that certain products containing alkyl glucosides have an interesting foam-inhibiting effect.

DESCRIPTION OF THE INVENTION

Accordingly, the present invention relates to a mixture of (A) an alkyl glucoside corresponding to the general formula R-O-(G)$_n$ and (B) a primary monofunctional alcohol ROH, R being derived from a linear or branched alkyl chain essentially containing 16 to 28 carbon atoms, G being a glucose unit, n assuming values of 1 to 10 and the ratio by weight of (A) to (B) being from 20:1 to 1:9.

Both in the alcohols (B) and in the alkyl glucosides (A), the alkyl radical R, which is derived from the primary and monofunctional alcohols (B), contains a linear or branched alkyl chain essentially containing 16 to 28 carbon atoms, i.e. the alkyl radicals are saturated aliphatic radicals in "technical" grade purity. The alkyl radicals R are preferably derived from fatty alcohols containing 16 to 22 carbon atoms. Typical representatives of the alcohols used are hexadecanol, octadecanol, behenyl alcohol (docosanol) and Guerbet alcohols, such as 2-octyldodecan-1-ol.

Since the fatty alcohols preferably emanate from natural fats, mixtures of technical grade fatty alcohols are also suitable. Accordingly, the alkyl radical R also includes radicals consisting of several carbon chains having different lengths. Through the use of technical grade cuts, the alkyl radical R may also contain parts of $C_{14}$ and even $C_{12}$ alkyl chains in small quantities. However, their percentage content in the mixtures according to the invention corresponds at most to their percentage content in the natural composition of the technical grade fatty alcohols used. At all events, the $C_{12-14}$ alkyl component need Pelt be regarded as critical as long as it is so small that it does not impair the foam-inhibiting effect of the $C_{16-18}$ alkyl radicals.

The use of tallow alcohol and behenyl alcohol is particularly preferred.

The alkyl glucosides (A) used in accordance with the invention have a degree of oligomerization n of 1 to 10. They may be produced by methods known per se. However, finely divided glucose or a sugar made up of glucose units is preferably reacted directly with an excess of alcohol (B) in the presence of an acidic catalyst, such as for example sulfuric acid or—preferably—p-toluene sulfonic acid, with simultaneous removal of the water formed by distillation under reduced pressure (10–25 mbar). The reaction product which accumulates in acidic form is then neutralized. Organic or inorganic basic alkali metal, alkaline earth metal or aluminium or alkali metal/aluminium compounds are suitable for this purpose. pH values of at least 8 and preferably of about 9 are established. Magnesium compounds, for example organomagnesium compounds, such as magnesium alcoholates, or inorganic magnesium compounds, such as magnesium oxide or magnesium hydroxide, are particularly suitable for neutralizing the catalyst. However, another useful neutralizing agent is zeolite NaA, particularly in admixture with calcium hydroxide.

If removal of the excess alcohol by distillation is necessary, it may be carried out in known product-friendly vacuum distillation units until the desired ratio by weight of (A) to (B) is established. Thin-layer evaporators and/or falling-film evaporators are particularly suitable.

The alkyl glucoside/alcohol mixtures according to the invention have a ratio by weight of (A) to (B) of 20:1 to 1:9 and preferably 19:1 to 1:5. Mixtures in which R is a tallow alkyl or behenyl group and the mixing ratio of (A) to (B) is from 6:1 to 1:5 are of particular importance.

The products (A+B) according to the invention suitable for use as foam inhibitors are effective in very small quantities. They are generally used in quantities of distinctly less than 14 by weight, based on the material to be foam-regulated. Even the addition of traces, for example of 10 to 500 ppm, is sufficient to initiate a spontaneous and long-lasting (at least 30 minutes) foam-inhibiting effect. The products (A+B) are used in quantities of 0.0012 to 0.05% by weight, preferably in quantities of 0.0015 to 0.02% by weight and more preferably in quantities of 0.0015 to 0.0154 by weight, based on the material to be foam-inhibited.

The possibility of using the alkyl glucoside/alcohol mixture (A+B) in accordance with the invention in a water-immiscible liquid carrier oil (C), which does not itself act as a foam inhibitor and is chemically inert, is another advantage over the prior art. Suitable carrier oils are, for example, paraffin oil, mineral oil and oxo oil. Paraffin oil is understood by the expert to be a liquid mixture of purified, saturated aliphatic hydrocarbons whereas mineral oil contains aromatic hydrocarbons in addition to aliphatic hydrocarbons. Oxo oil is the name given to the residue obtained in the production of oxoalcohols (by the oxosynthesis or hydroformylation method) after distillation of the alcohols. Paraffin oil is preferably used as the carrier oil (C).

Foam inhibitor mixtures containing 80 to 97% by weight of the carrier oil (C) and 3 to 20% by weight of the alkyl glucoside/alcohol mixture (A+B) are preferred. Particularly high activity is developed by foam inhibitor mixtures containing (A) 0.8 to 12.9% by weight of the alkyl glucoside $R\text{-}O\text{-}(G)_n$, (B) 0.7 to 12.5% by weight of the primary monofunctional alcohol ROH and (C) 85 to 95 by weight of the carrier oil, R being a tallow alkyl or behenyl group and paraffin oil being used as the carrier oil.

EXAMPLES

Example 1

Preparation of behenyl glucoside

A mixture of 1264 g (4 mol) behenyl alcohol (docosanol) and 180 g (1 mol) anhydrous glucose is heated with stirring to 110°–115° C. and, after the addition of 1.2 g p-toluene sulfonic acid, is stirred for 4 hours under a vacuum of 20 mbar, the water formed during the reaction being removed by distillation. After cooling of the solution to 90° C. and purging with nitrogen, 2.5 g magnesium ethylate are added at normal pressure and the mixture is stirred for 30 minutes, a pH value of approx. 9 (as measured on a 10% solution in water/ethanol) being established. The reaction mixture was filtered through a filter having a pore diameter of 250 $\mu$m (approx. 2 g residue) and, after cooling to room temperature, was ground to a fine powder. Product characteristics: OH value 276; acid value 1.1: Behenyl alcohol 82% by weight; behenyl glucoside 184 by weight.

To prepare behenyl glucoside/behenyl alcohol mixtures having a lower fatty alcohol content, behenyl alcohol was distilled off in vacuo (0.05–0.01 mbar) to the desired residual content after filtration of the reaction solution. Up to 1166 g behenyl alcohol were recovered over a period of 4.5 hours, the sump temperature being increased to at most 210° C. After cooling to room temperature, the distillation residue (259 g) was ground to a fine powder. Product characteristics: OH value 694; acid value 0; residual behenyl alcohol (GC analysis) 5% by weight.

Example 2

Foam-inhibiting test on beet syrup 110 g sugar syrup were mixed with 420 ml water (17° d) in a 2 liter measuring cylinder. The total volume was 500 ml. The solution was taken in at the bottom of the measuring cylinder by means of a pump. The liquid was returned through a tube of which the outlet opening was level with the top edge of the measuring cylinder. The liquid thus circulated fell freely back into the measuring cylinder from a height of approx. 30 cm. The temperature was thermostatically controlled to 25° C. The output of the pump was regulated in such a way that a constant, dynamic foam height of 1800 to 2000 ml was established. The measured value for the height of foam is the total volume of liquid (500 ml) and the foam volume (1500 ml).

In each test, 0.1 ml of a mixture of 10% by weight of one of the products I, II and III according to the invention and 90% by weight paraffin oil (White oil Pharmaceutical 40, a brand name of Deutsche Texaco AG) was added by micropipette, I containing 95% by weight hexadecyl glucoside +5% by weight hexadecanol, II containing 85% by weight tallow alcohol glucoside +15% by weight tallow alcohol and III containing 18% by weight behenyl glucoside +82% by weight behenyl alcohol.

The foam height was measured after 0.5, 1, 2, 3, 5, 10, 20 and 30 minutes.

The paraffin oil used had no significant foam-inhibiting effect on its own, i.e. without the products according to the invention.

In comparison tests, 10% by weight mixtures of behenyl alcohol IV and of a known foam inhibitor V in paraffin oil were tested, V consisting of ethoxylated and propoxylated oxo oil containing 15% by weight ethylene oxide (EO) and 40% by weight propylene oxide (PO) (Dehysan K 7204, a brand name of Henkel KGAA).

TABLE 1

| Sub-stance | Blank value | Form height in ml Time in minutes after additions of 0.1 ml foam inhibitor | | | | | | | |
|---|---|---|---|---|---|---|---|---|---|
| | | 0.5 | 1 | 2 | 3 | 5 | 10 | 20 | 30 |
| I | 2000 | 1440 | 680 | 660 | 660 | 660 | 680 | 900 | 1300 |
| II | 2000 | 800 | 540 | 580 | 580 | 580 | 640 | 800 | 1100 |
| III | 2000 | 600 | 560 | 560 | 560 | 640 | 680 | 780 | 880 |
| IV | 2000 | 1100 | 720 | 640 | 620 | 680 | 780 | 840 | 960 |
| V | 2000 | 1500 | 1340 | 1140 | 1000 | 800 | 680 | 700 | 740 |

As can be seen from Table 1, even mixtures, such as III, containing a small amount of glucosides had a significantly better foam-inhibiting effect than pure fatty alcohol IV.

By comparison with V, products I, II and III according to the invention not only produced lower (products II and III) or comparable foam heights (I), they also had a spontaneous effect. Thus, the maximum foam inhibition achievable by a product was achieved after only 1 minute for III and after 2 minutes for I and II. By contrast, the lowest foam height in the case of comparison substance V was only reached after 10 minutes.

What is claimed is:

1. A foam-inhibiting mixture consisting essentially of an alkyl glucoside (A) corresponding to the formula R-O-(G)$_n$, a primary monofunctional alcohol (B) corresponding to the formula ROH, and a water-immiscible carrier oil (C), wherein R is a linear or branched alkyl chain containing from 16 to 28 carbon atoms, G is a glucose unit, n has a value of 1 to 10, and the weight ratio of (A) to (B) is from 20:1 to 1:9.

2. A foam-inhibiting mixture as in claim 1 wherein R is a tallow alkyl or behenyl radical, and the weight ratio of (A) to (B) is from 6:1 to 1:5.

3. A foam-inhibiting mixture as in claim 1 wherein said carrier oil (C) is selected from the group consisting of paraffin oil, mineral oil, and oxo oil.

4. A foam-inhibiting mixture as in claim 1 consisting essentially of from 3 to 20% by weight of said alkyl glucoside and said alcohol (A+B), and from 80 to 97% by weight of said carrier oil (C), based on the weight of said mixture.

5. A foam-inhibiting mixture as in claim 1 consisting essentially of from 0.8 to 12.9% by weight of said alkyl glucoside (A), from 0.7 to 12.5% by weight of said alcohol (B), and from 85 to 95% by weight of said carrier oil (C), based on the weight of said mixture.

6. A foam-inhibiting mixture as in claim 5 wherein R is a tallow alkyl or behenyl radical, and said carrier oil is paraffin oil.

7. The process of inhibiting the formation of foam in a composition, comprising adding to said composition a foam-inhibiting amount of a mixture consisting essentially of an alkyl glucoside (A) corresponding to the formula R-O-(G)$_n$, a primary monofunctional alcohol (B) corresponding to the formula ROH, and a water-immiscible carrier oil (C), wherein R is a linear or branched alkyl chain containing from 16 to 28 carbon atoms, G is a glucose unit, n has a value of 1 to 10, and the weight ratio of (A) to (B) is from 20:1 to 1:9.

8. The process as in claim 7 wherein R is a tallow alkyl or behenyl radical, and the weight ratio of (A) to (B) is from 6:1 to 1:5.

9. The process as in claim 7 wherein said carrier oil (c) is selected from the group consisting of paraffin oil, mineral oil, and oxo oil.

10. The process as in claim 7 wherein said mixture consists essentially of from 3 to 20% by weight of said alkyl glucoside and said alcohol (A+B), and from 80 to 97% by weight of said carrier oil (C), based on the weight of said mixture.

11. The process as in claim 7 wherein the mixture consists essentially of from 0.8 to 12.9% by weight of said alkyl glucoside (A), from 0.7 to 12.5% by weight of said alcohol (B), and from 85 to 95% by weight of said carrier oil (C), based on the weight of said mixture.

12. The process as in claim 11 wherein R is a tallow alkyl or behenyl radical, and said carrier oil is paraffin oil.

13. The process as in claim 7 wherein said composition comprises a food composition.

14. The process as in claim 7 wherein said alkyl glucoside and said alcohol (A+B) are present in an amount of from 0.0012 to 0.05% by weight, based on the weight of said composition.

* * * * *